United States Patent
Li et al.

(10) Patent No.: US 12,219,362 B2
(45) Date of Patent: Feb. 4, 2025

(54) SYSTEMS AND METHODS FOR OBTAINING A SUBSCRIBER IDENTITY FOR AN EMERGENCY CALL

(71) Applicant: Verizon Patent and Licensing Inc., Basking Ridge, NJ (US)

(72) Inventors: Mingxing S. Li, San Jose, CA (US); Jeffrey Torres, Boonton, NJ (US); Edward Amoah, Parsippany, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 426 days.

(21) Appl. No.: 17/114,947

(22) Filed: Dec. 8, 2020

(65) Prior Publication Data
US 2022/0182838 A1    Jun. 9, 2022

(51) Int. Cl.
| H04W 12/40 | (2021.01) |
| H04L 65/1016 | (2022.01) |
| H04L 65/1104 | (2022.01) |
| H04M 3/51 | (2006.01) |
| H04M 7/12 | (2006.01) |
| H04W 12/03 | (2021.01) |

(52) U.S. Cl.
CPC ......... *H04W 12/40* (2021.01); *H04L 65/1016* (2013.01); *H04L 65/1104* (2022.05); *H04M 3/5116* (2013.01); *H04M 7/1285* (2013.01); *H04W 12/03* (2021.01); *H04M 2203/6045* (2013.01); *H04M 2242/04* (2013.01)

(58) Field of Classification Search
CPC ....... H04W 76/50; H04W 4/02; H04W 4/029; H04W 80/10; H04W 4/90; H04W 12/72; H04L 63/0823; H04L 63/0869; H04L 65/1016; H04L 65/1069; H04L 65/1104; H04L 65/1101; H04M 1/72418
See application file for complete search history.

(56) References Cited

U.S. PATENT DOCUMENTS

| 8,280,341 | B2 * | 10/2012 | Edelmann | H04L 12/6418 455/404.1 |
| 8,781,442 | B1 * | 7/2014 | Link, II | H04L 9/30 370/338 |
| 9,049,551 | B2 * | 6/2015 | Dunn | H04W 4/20 |
| 10,912,056 | B2 * | 2/2021 | Eisner | H04W 4/02 |
| 11,388,601 | B1 * | 7/2022 | Kahn | H04W 12/66 |
| 11,564,266 | B1 * | 1/2023 | Kahn | H04W 76/10 |
| 2004/0172536 | A1 * | 9/2004 | Malville | H04L 63/0428 713/169 |
| 2005/0105496 | A1 * | 5/2005 | Ambrosino | H04W 4/02 342/450 |
| 2006/0104306 | A1 * | 5/2006 | Adamczyk | H04L 67/14 370/352 |

(Continued)

*Primary Examiner* — Lizbeth Torres-Diaz

(57) ABSTRACT

In some implementations, an internet protocol multimedia subsystem (IMS) may receive a device identity of the user device as part of an emergency call. The IMS may transmit the device identity to an emergency call server (ECS). The IMS may receive, from the ECS, a subscriber identity of the user device. The IMS may transmit the subscriber identity to a public safety answering point (PSAP) through a next generation core services (NGCS) network that uses a Stir and Shaken protocol. The emergency call is then established with a true subscriber identity of the user device.

20 Claims, 7 Drawing Sheets

(56) References Cited

U.S. PATENT DOCUMENTS

| | | | | |
|---|---|---|---|---|
| 2006/0274729 | A1* | 12/2006 | Self | H04L 65/1101 |
| | | | | 370/352 |
| 2009/0147926 | A1* | 6/2009 | Fahrenthold | H04M 3/323 |
| | | | | 379/1.01 |
| 2011/0026440 | A1* | 2/2011 | Dunn | H04M 3/5116 |
| | | | | 370/259 |
| 2011/0064205 | A1* | 3/2011 | Boni | H04M 11/04 |
| | | | | 379/45 |
| 2011/0134897 | A1* | 6/2011 | Montemurro | H04L 65/1096 |
| | | | | 370/338 |
| 2011/0201299 | A1* | 8/2011 | Kamdar | H04L 65/1069 |
| | | | | 455/404.1 |
| 2013/0067552 | A1* | 3/2013 | Hawkes | H04W 12/08 |
| | | | | 726/7 |
| 2013/0084824 | A1* | 4/2013 | Hursey | H04M 11/04 |
| | | | | 455/404.1 |
| 2014/0148117 | A1* | 5/2014 | Basore | H04W 4/90 |
| | | | | 455/404.1 |
| 2016/0150366 | A1* | 5/2016 | Miller | H04W 4/08 |
| | | | | 455/456.4 |
| 2017/0366954 | A1* | 12/2017 | Sabeur | H04W 8/12 |
| 2021/0274312 | A1* | 9/2021 | Wolcott | H04H 60/45 |

* cited by examiner

SYSTEMS AND METHODS FOR OBTAINING A SUBSCRIBER IDENTITY FOR AN EMERGENCY CALL

BACKGROUND

A Public-Safety Answering Point handles emergency calls from user devices. The PSAP may be part of a Next Generation 911 service that adheres to a common set of standards for achieving 911 interoperability across multiple local, regional, state, national, and international public safety jurisdictions.

DETAILED DESCRIPTION OF PREFERRED EMBODIMENTS

Figure 1A:
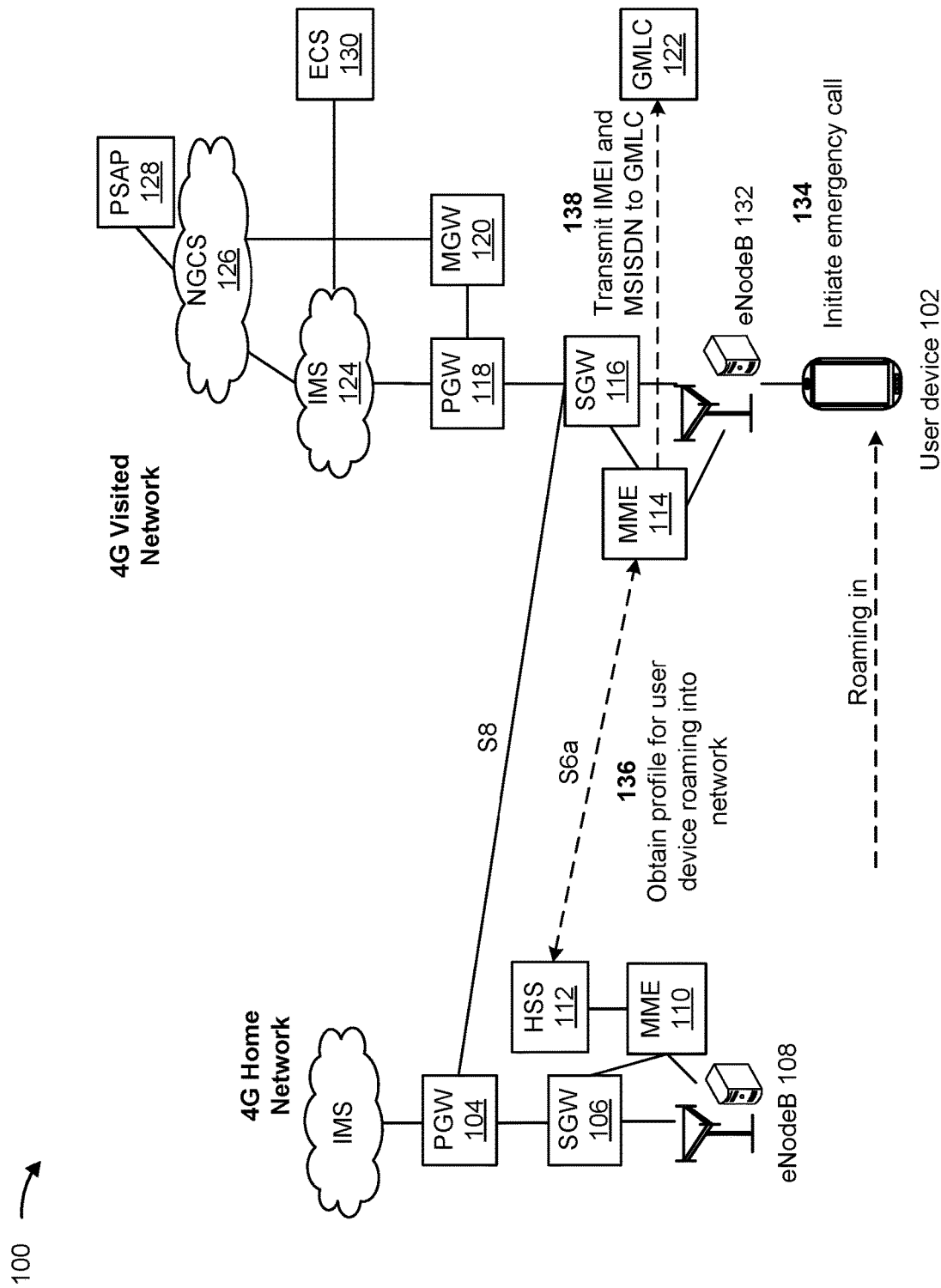
FIGS. 1A-1D are diagrams of an example associated with obtaining a subscriber identity for an emergency call.

The following detailed description of example implementations refers to the accompanying drawings. The same reference numbers in different drawings may identify the same or similar elements.

A user device may roam from a home network to a visited network. An Internet Protocol Multimedia Subsystem (IMS) of a home network may be used for voice calls by the user device, but an IMS of a visited network may also need to be used for emergency calls. Currently, when a roaming user device makes an emergency (911) call in a visited network, the 911 call is made as an anonymous 911 call. A subscriber identity of a user device, such as a mobile station international subscriber directory number (MSISDN), is not known for an anonymous 911 call, but networks are supposed to place 911 calls even if the 911 call is anonymous. This is not an issue with a user device in a home network, where the MSISDN is known. However, if the user device is roaming into a visited network, the actual MSISDN is not known by the visited network thereby causing the 911 call to be anonymous.

Not having the MSISDN creates an issue for the visited network if the visited network uses a Stir and Shaken (SS) protocol when delivering the 911 call to a Next Generation Public Safety Answering Point (PSAP) via a Next Generation Core Services (NGCS) network. The SS protocol is specified by legislation and intended to address robocalls with a hidden or spoofed identity. The SS protocol requires an IMS network to include a caller's true subscriber identity, encrypted and signed, with other information in an identification header for the NGCS network. That is, the SS protocol requires the use of an actual MSISDN. Without the actual MSISDN, the PSAP may not be able to call the phone back or answer the 911 call.

According to some implementations described herein, the IMS handling the 911 call may provide a user device's device identity, such as an international mobile equipment identity (IMEI) to an emergency call server (ECS). The ECS may then provide the MSISDN to the IMS. The ECS may obtain the MSISDN from a gateway mobile location center (GMLC), which receives the MSISDN from a mobility management entity (MME). When a roaming user device places a 911 call, the MME obtains the profile (including the MSISDN) from a home subscriber server (HSS) of the home network (e.g., according to a roaming agreement between the home network and the visited network), and provides the MSISDN to the GMLC. In this way, the IMS may place the 911 call through to the PSAP via the NGCS using the SS protocol, and the PSAP may have the MSISDN of the roaming user device. The PSAP is able to obtain a true subscriber identity and answer the 911 call. The PSAP may also call the roaming user device back if necessary.

FIGS. 1A-1D are diagrams of an example 100 associated with obtaining a subscriber identity for an emergency call (e.g., 911 call). As shown in FIGS. 1A-1D, example 100 includes a user device 102 that roams into a 4G visited network or a 5G visited network.

FIG. 1A shows user device 102 roaming from a 4G home network into a 4G visited network. User device 102 may be referred to as a "roaming user device" or a "visiting user device." The 4G home network may include a packet data network gateway (PGW) 104 that provides connectivity for user device 102 to external packet data networks (PDNs), a session gateway (SGW) 106 that routes packets to user device 102 through an eNodeB (eNB) 108, and a mobility management entity (MME) 110 that manages authentication, activation, deactivation, and/or mobility functions associated with user device 102. The 4G home network may also include a home subscriber server (HSS) 112 that manages information associated with user device 102. For example, HSS 112 may manage subscription information associated with user device 102, such as information that identifies a subscriber profile of a user associated with user device 102, information that identifies services and/or applications that are accessible to user device 102, information that identifies a treatment of user device 102 (e.g., quality of service (QoS) information, a quantity of minutes allowed per time period, a quantity of data consumption allowed per time period), and/or similar information.

The 4G visited network may include an MME 114, an SGW 116, and a PGW 118 that routes traffic to a media gateway (MGW) 120. The 4G visited network may include, or may communicate with, a GMLC 122 that supports location-based services. The 4G visited network may also include an IMS 124 that can forward calls to a PSAP 128 via NGCS 126. IMS 124 may communicate with an ECS 130 that helps to route emergency calls.

As shown in FIG. 1A, and by reference number 134, user device 102 may initiate an emergency call that is transmitted from an eNB 132 to SGW 116. SGW 116 may route the emergence call to PGW 118. Meanwhile, MME 114 may obtain subscriber profile information for user device 102 from HSS 112 of the 4G home network, as shown by reference number 136. This subscriber profile information may include an MSISDN for user device 102. As shown by reference number 138, MME 114 may transmit identification information to GMLC 122. The identification information, which was obtained from HSS 112, may include an MSISDN and a corresponding IMEI.

Figure 1B:
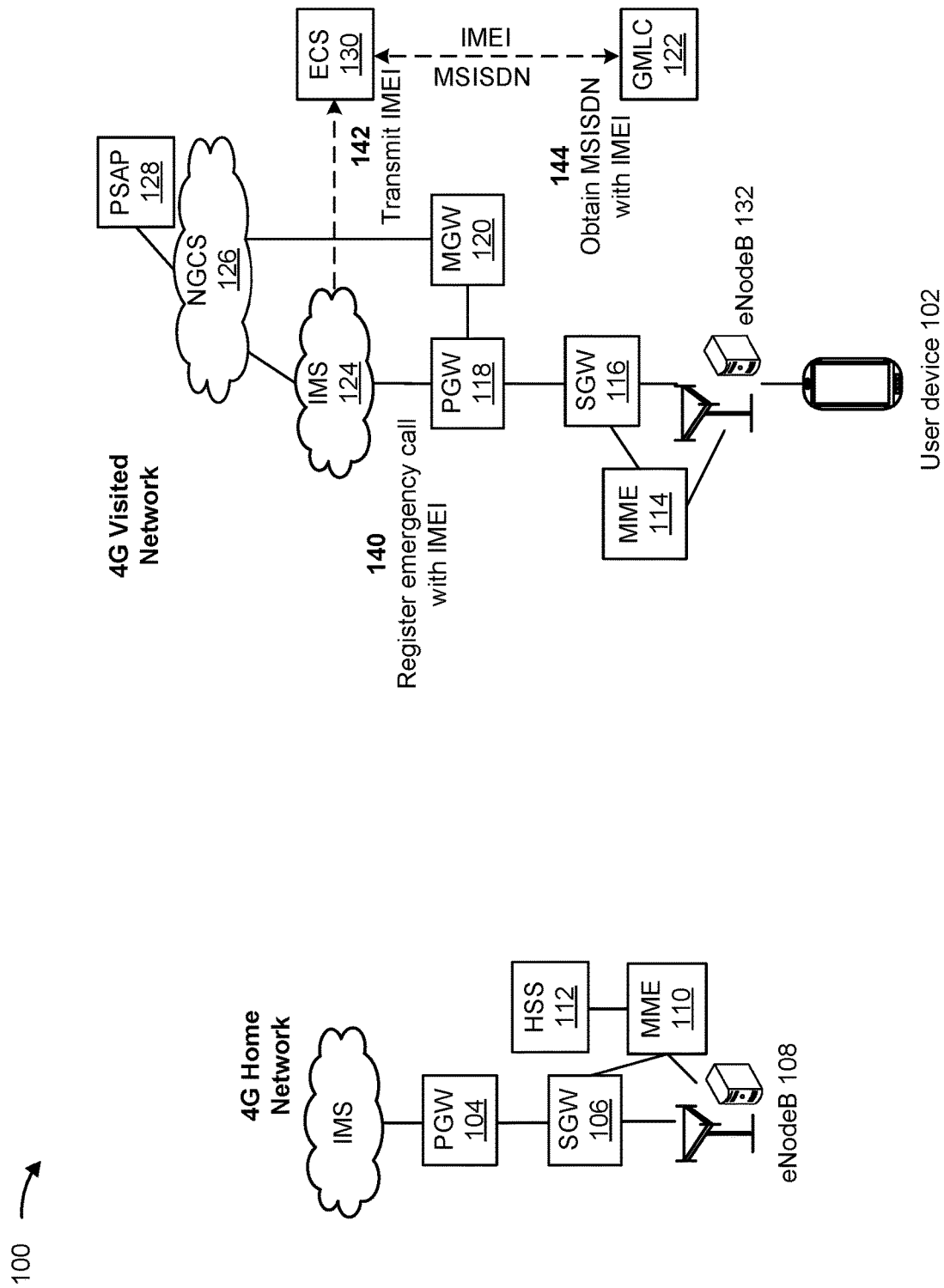

As shown by FIG. 1B, and by reference number 140, PGW 118 may register the emergency call with IMS 124. Registration may be with the IMEI. IMS 124 may not have the MSISDN of user device 102 and thus may be unable to route the call through NGCS 126. As shown by reference number 142, IMS 124 may transmit the IMEI of user device 102 in a request to ECS 130 for the MSISDN of user device 102. ECS 130 may have the MSISDN of user device 102. If not, ECS 130 may obtain the MSISDN of user device 102 from GMLC 1122. As shown by reference number 144, ECS 130 may transmit the IMEI of user device 102 to GMLC 122 and receive the MSISDN. GMLC 122 may have received the MSISDN from MME 114 or may have stored the MSISDN from another call.

Figure 1C:
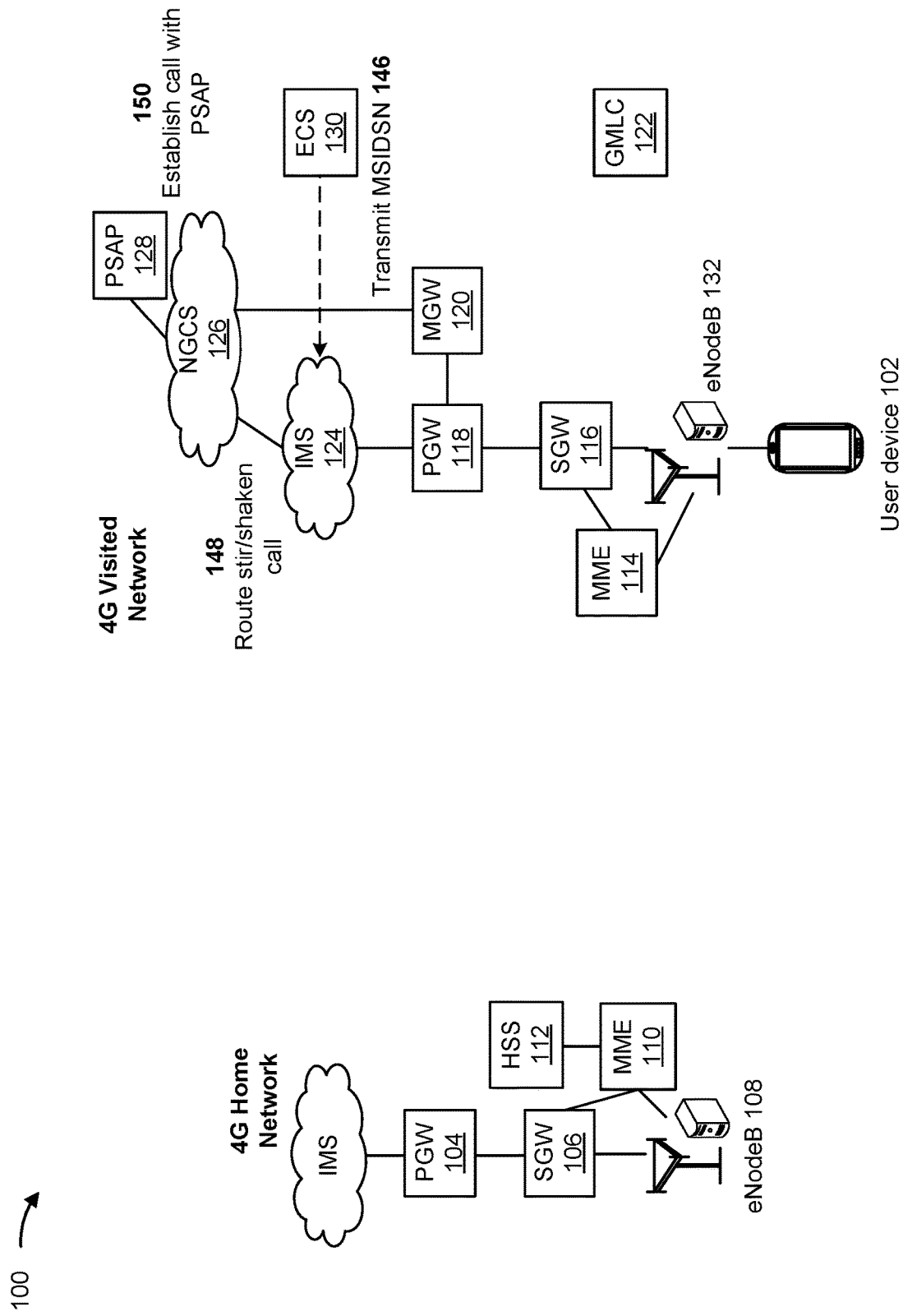

As shown by FIG. 1C, and by reference number 146, ECS 130 may transmit the MSISDN to IMS 124. As IMS 124 now has the MSISDN of user device 102, IMS 124 is able to sign and encrypt the MSISDN and include the encrypted and signed MSISDN in a header. As shown by reference number 148, IMS 124 may route the emergency call, with the encrypted and signed MSISDN, to NGCS 126 as part of an SS protocol. As shown by reference number 150, NGCS 126 may establish the emergency call with PSAP 128. PSAP 128, having received the MSISDN from IMS 124, now has the true subscriber identity of user device 102 and is able to respond to the emergency call.

Figure 1D:
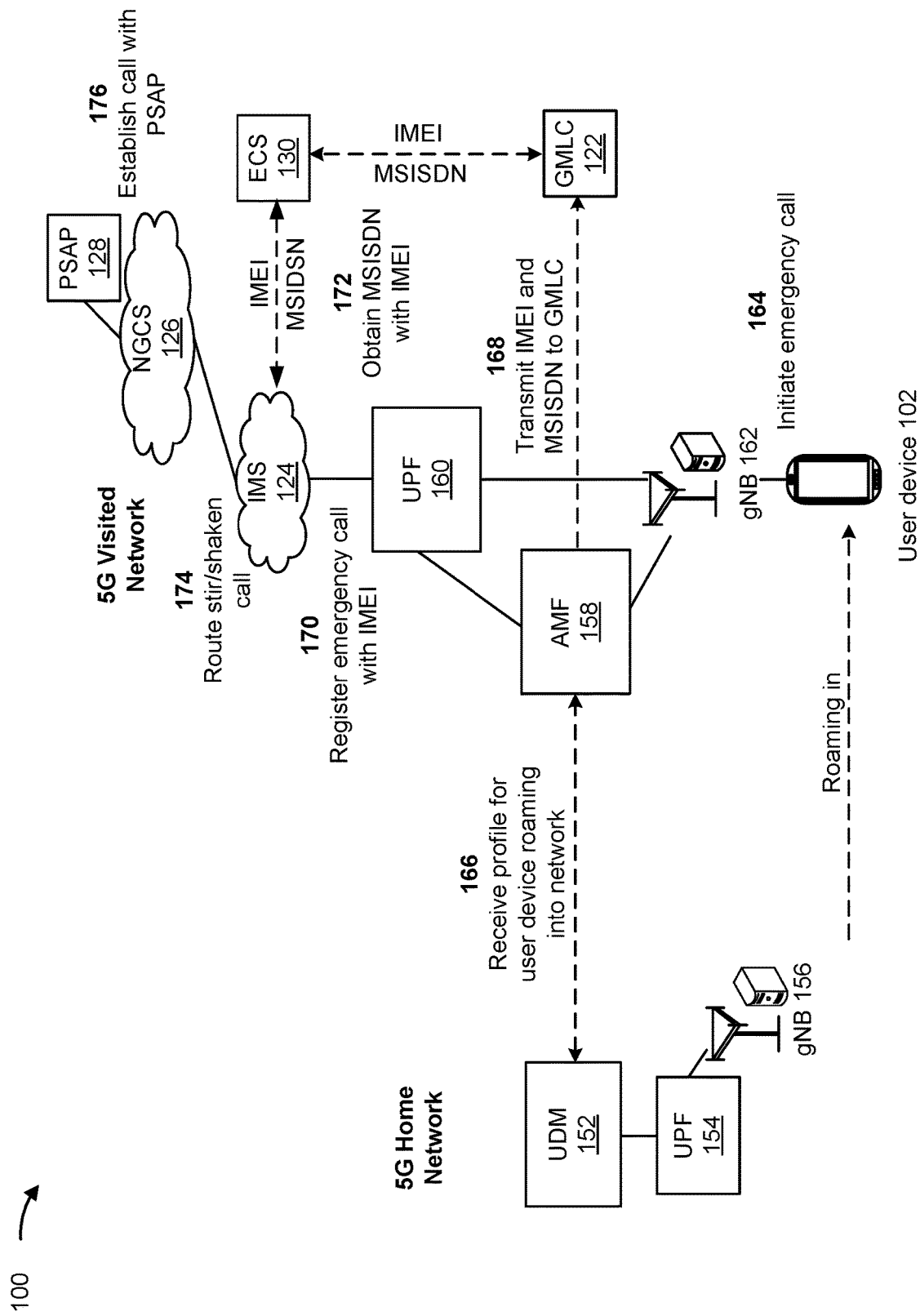

FIG. 1D shows user device 102 roaming from a 5G home network into a 5G visited network. Note that while FIGS. 1A-1C show 4G networks and FIG. 1D shows 5G networks, user device 102 may roam from a 4G network to a 5G network, or from a 5G network to a 4G network. In either case, the visited network may obtain the MSISDN from the home network.

The 5G home network shown in FIG. 1D may include, among other network elements, a unified data management (UDM) component 152 that stores user data and subscriber profile information and a user plane function (UPF) 154 that routes information from user device 102 via a gNodeB (gNB) 156. The 5G visited network may include, among other network elements, an access and mobility management function (AMF) 158 that acts as a termination point for non-access stratum (NAS) signaling, and/or mobility management. The 5G visited network also includes a UPF 160 that routes calls from gNB 162 to IMS 124.

FIG. 1D shows operations similar to those shown in FIGS. 1A-1C. As shown in FIG. 1D, and by reference number 164, user device 102 may start an emergency call that is transmitted from gNB 162 to UPF 160. Meanwhile, AMF 158 may obtain subscriber profile information for user device 102 from UDM 152 of the 5G home network, as shown by reference number 166. This subscriber profile information may include an MSISDN for user device 102. As shown by reference number 168, AMF 158 may transmit identification information to GMLC 122. The identification information may include an MSISDN and a corresponding IMEI.

As shown by reference number 170, UPF 160 may register the emergency call with IMS 124. IMS 124 may not have the MSISDN of user device 102 and thus may be unable to route the call through NGCS 126. As shown by reference number 172, IMS 124 may transmit the IMEI of user device 102 in a request to ECS 130 for the MSISDN of user device 102. ECS 130 may have the MSISDN of user device 102. If not, ECS 130 may obtain the MSISDN of user device 102 from GMLC 122. ECS 130 may transmit the MSISDN to IMS 124.

IMS 124 is now able to sign and encrypt the MSISDN and include the encrypted and signed MSISDN in a header. As shown by reference number 174, IMS 124 may route the emergency call, with the encrypted and signed MSISDN, to NGCS 126 as part of an SS protocol. As shown by reference number 176, NGCS 126 may establish the emergency call with PSAP 128. Having received the MSISDN from IMS 124, PSAP 128 now has the true subscriber identity of user device 102 and is able to respond to the emergency call.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
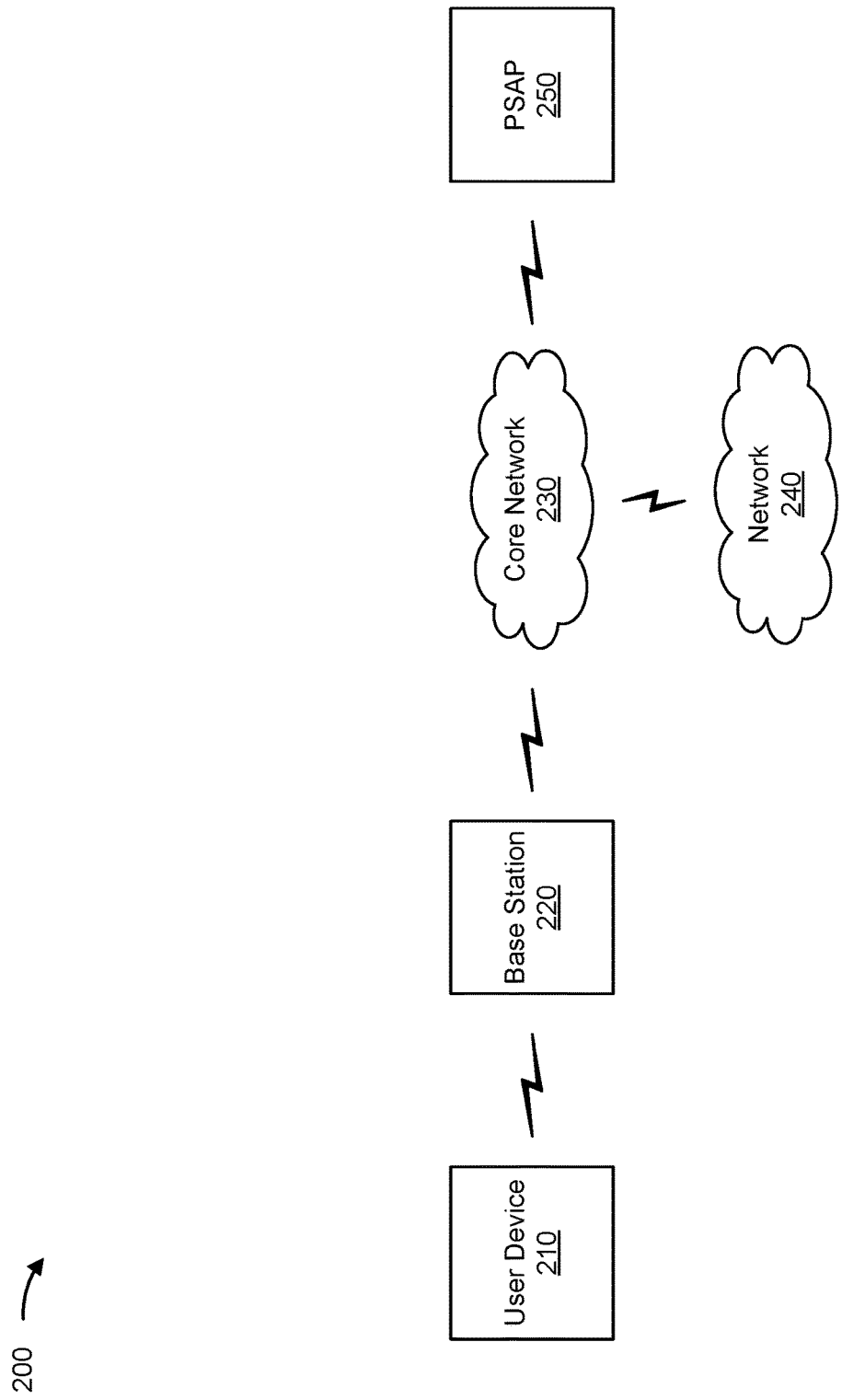
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210, base station 220, and a core network 230 in communication with another network 240 and/or PSAP 250. Devices of environment 200 may interconnect via wired connections, wireless connections, or a combination of wired and wireless connections.

User device 210 (e.g., user device 102) may include a device capable of communicating with other user devices, base station 220, core network 230, network 240, and/or PSAP 250. For example, user device 210 may include a mobile phone (e.g., a UE, a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. User device 210 may send traffic to and/or receive traffic from another user device, network 240, and/or PSAP 250 (e.g., via base station 220, an SGW of core network 230, a PGW of core network 230, or a UPF of core network 230).

Base station 220 may include one or more devices capable of transferring traffic, such as audio, video, text, and/or other traffic, destined for and/or received from user device 210. In some implementations, base station 220 may include an eNB associated with a 4G LTE network that receives traffic from and/or sends traffic to network 240 via a SGW and/or a PGW. Additionally, or alternatively, base station 220 may include a gNB associated with a 5G network that receives traffic from and/or sends traffic to network 240 via a UPF.

Base station 220 may send traffic to and/or receive traffic from user device 210 via an air interface. In some implementations, base station 220 may include a small cell base station, such as a base station of a microcell, a picocell, or a femtocell. Base station 220 may include a cellular site, a cellular tower, an access point, or a transmit receive point (TRP). Base station 220 may transfer traffic between user device 210 (e.g., using a cellular radio access technology (RAT)), other base stations (e.g., using a wireless interface or a backhaul interface, such as a wired backhaul interface), and/or network 240. Base station 220 may provide one or more cells that cover geographic areas. Some base stations 220 may be mobile base stations. Some base stations 220 may be capable of communicating using multiple RATs.

In some implementations, base station 220 may perform scheduling and/or resource management for user device 210 covered by base station 220 (e.g., user device 210 covered by a cell provided by base station 220). In some implementations, base station 220 may include a network controller, a self-organizing network (SON) module or component, or a similar module or component. In other words, a base station 220 may perform network control, scheduling, and/or network management functions (e.g., for other base stations 220 and/or for uplink, downlink, and/or sidelink communications of user devices 210 covered by base station 220). In some implementations, base station 220 may include a central unit and multiple distributed units. The central unit may coordinate access control and communication with regard to the multiple distributed units. The multiple distributed units may provide user devices 210 and/or other base stations 220 with access to network 240.

Core network 230 may include the 4G visited network shown in FIG. 1A-1D or the 5G visited network shown in FIG. 1D. An IMS and an ECS may coordinate to obtain an MSISDN of user device 210 such that the IMS may use the SS protocol to establish an emergency call to a PSAP with a true subscriber identity of user device 210.

Network 240 may include one or more wired and/or wireless networks. For example, network 240 may include a cellular network (e.g., a 5G network, an LTE 4G network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

PSAP 250 may include one or more devices that serve as an answering point for emergency calls. PSAP 250 may include one or more devices in or associated with a call center where emergency calls are terminated. PSAP 250 may have a real telephone number that is called, and a network operator may route an emergency call to PSAP 250, which serves as a primary and/or secondary PSAP for a coverage area of the visited network.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
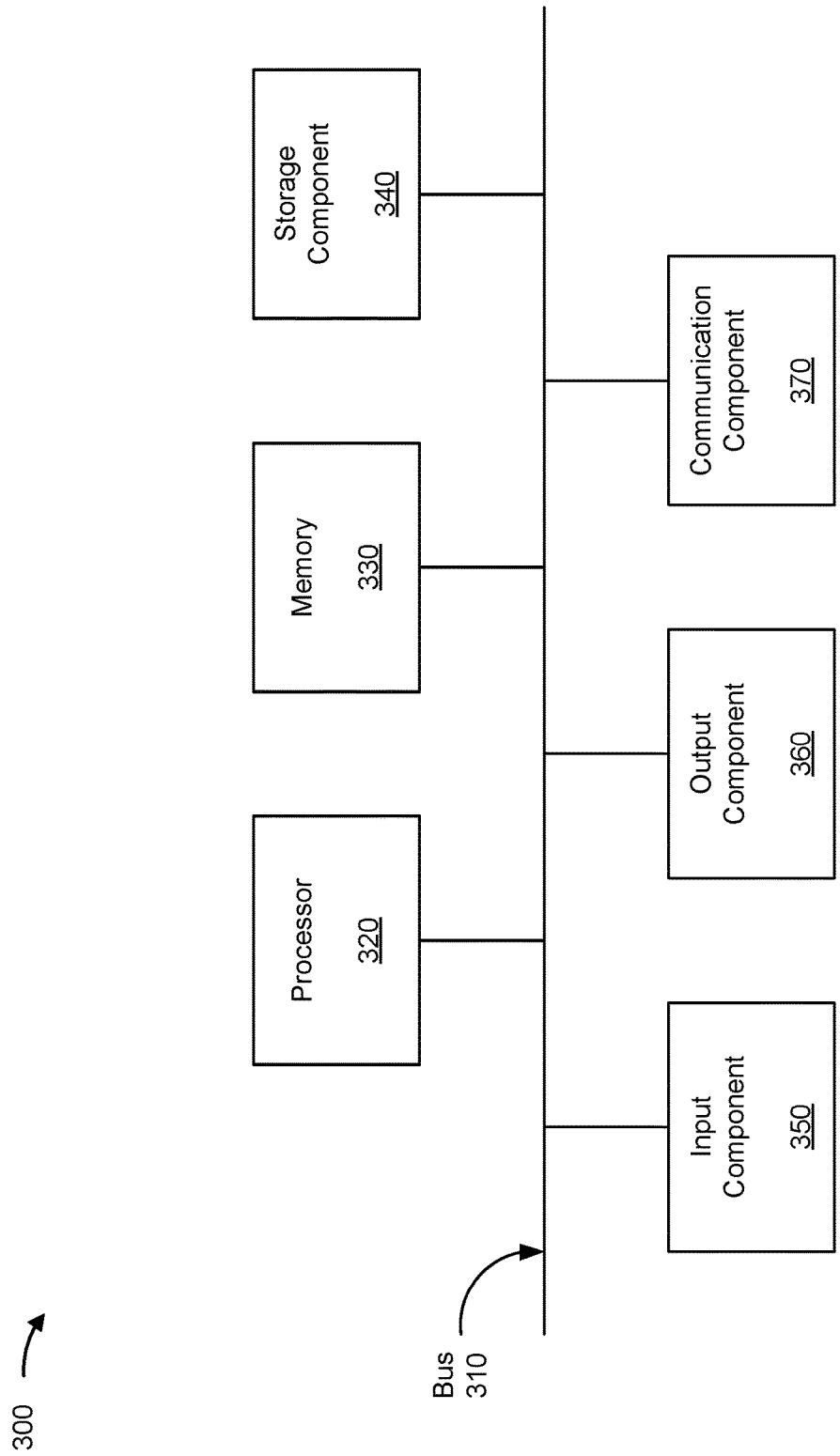
FIG. 3 is a diagram of example components of one or more devices of FIG. 2.

FIG. 3 is a diagram of example components of a device 300, which may correspond to a device for obtaining an MSISDN for the routing of an emergency call through an NGCS, a core network device, or a network component that may obtain an MSISDN using an IMEI. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a CPU, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
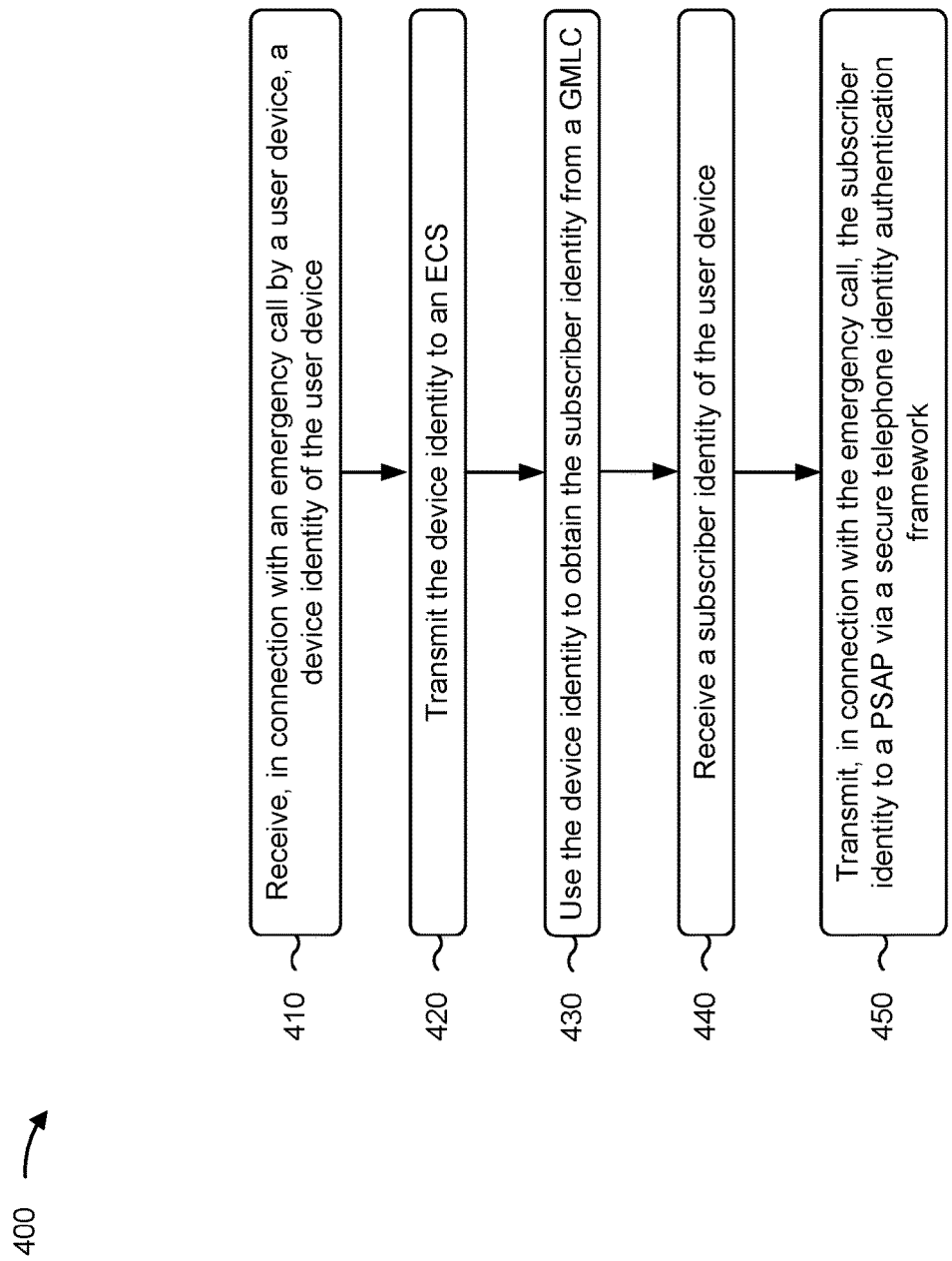
FIG. 4 is a flowchart of an example process relating to obtaining a subscriber identity for an emergency call.

FIG. 4 is a flowchart of an example process 400 associated with obtaining a subscriber identity for an emergency call. In some implementations, one or more process blocks of FIG. 4 may be performed by a device of an IMS (e.g., IMS 124). In some implementations, one or more process blocks of FIG. 4 may be performed by another device or a group of devices separate from or including the device, such as a device of an ECS (e.g., ECS 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a device identity of a user device (block 410). For example, the device may receive a device identity of the user device, as described above. In some implementations, the device identity is an IMEI, and a subscriber identity of the user device is an MSISDN. The receiving may be in association with registration of an emergency call. For example, the user device may be a visiting or roaming user device that sends a session initiation protocol (SIP) invite to "urn:service:sos" with a contact header containing an IMEI in a "+sip.instance." In some implementations, the device is an IMS device.

As further shown in FIG. 4, process 400 may include transmitting the device identity to an ECS (block 420). For example, the device may transmit the device identity to an ECS, as described above. In some implementations, transmitting the device identity to the ECS includes transmitting the device identity in a SIP invite query. The device identity may be transmitted in a P-Com header of the SIP invite query. In some implementations, process 400 includes receiving, by the device, routing information for an NGCS from the ECS, and transmitting the subscriber identity to the PSAP includes transmitting the subscriber identity to the PSAP via the NGCS based on the routing information.

As further shown in FIG. 4, process 400 may include using the device identity to obtain a subscriber identity of the user device (block 430). For example, the device may use the device identity to obtain the subscriber identity, as described above. In some implementations, a device of the ECS may receive the device identity and transmit the subscriber identity to the device (of the IMS). The device of the ECS may obtain the subscriber identity by transmitting the device identity to a GMLC and receiving the subscriber identity from the GMLC. In some implementations, the device of the ECS may transmit the device identity to the GMLC based on a determination that the subscriber identity is not in a SIP invite from the device of the IMS.

As further shown in FIG. 4, process 400 may include receiving the subscriber identity (block 440). For example, the device may receive the subscriber identity, as described above.

As further shown in FIG. 4, process 400 may include transmitting the subscriber identity to a PSAP via a secure telephone identity authentication framework (e.g., SS protocol) that uses the subscriber identity (block 450). For example, the device may transmit the subscriber identity to a PSAP via a secure telephone identity authentication framework that uses the subscriber identity, as described above. The device may transmit the subscriber identity in a P-Asserted-id header, add SS information, and route the emergency call to the NGCS. The NGCS may verify the information according to the SS protocol and send the call to the PSAP. The PSAP may now handle the call with a true subscriber identity of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, from an internet protocol multimedia subsystem (IMS), and in connection with an emergency call initiated by a user device while the user device is roaming in a visited network, a device identity of the user device;
   transmitting, by the device, the device identity to a gateway mobile location center (GMLC)

receiving, by the device and based on transmitting the device identity to the GMLC, a subscriber identity of the user device; and transmitting, by the device, the subscriber identity to the IMS to enable a response to the emergency call,
wherein the IMS is configured to sign and encrypt the subscriber identity, and
wherein the IMS is configured to route the emergency call when the emergency call includes the signed and encrypted subscriber identity as part of a protocol related to addressing calls with a hidden or spoofed identity.

2. The method of claim 1, wherein the device is an emergency call server (ECS) device.

3. The method of claim 1, wherein the device identity is an international mobile equipment identity (IMEI), and the subscriber identity is a mobile station international subscriber directory number (MSISDN).

4. The method of claim 1, wherein transmitting the device identity to the GMLC is based on a determination that the subscriber identity is not in a session initiation protocol invite.

5. The method of claim 1, further comprising:
transmitting, to the IMS, routing information for routing the emergency call through a next generation core service to a public safety answering point.

6. The method of claim 1, wherein transmitting the subscriber identity to the IMS causes the IMS to route the emergency call to a next generation core service.

7. The method of claim 1, wherein receiving the device identity includes receiving the device identity in a session initiation protocol header.

8. An emergency call server (ECS), comprising:
one or more processors configured to:
receive, from an internet protocol multimedia subsystem (IMS) in connection with an emergency call initiated by a user device while the user device is roaming in a visited network, a device identity of the user device;
transmit the device identity to a gateway mobile location center (GMLC);
receive, based on transmitting the device identity to the GMLC, a subscriber identity of the user device; and
transmit the subscriber identity to the IMS to enable a response to the emergency call,
wherein the IMS is configured to sign and encrypt the subscriber identity, and
wherein the IMS is configured to route the emergency call when the emergency call includes the signed and encrypted subscriber identity as part of a protocol related to addressing calls with a hidden or spoofed identity.

9. The ECS of claim 8, wherein the device identity is an international mobile equipment identity (IMEI), and the subscriber identity is a mobile station international subscriber directory number (MSISDN).

10. The ECS of claim 8, wherein the one or more processors, when receiving the device identity, are configured to receive the device identity in a session initiation protocol header.

11. The ECS of claim 10, wherein the session initiation protocol header is a P-Com header.

12. The ECS of claim 8, wherein the one or more processors are configured to transmit the device identity to the GMLC based on a determination that the subscriber identity is not in a session initiation protocol invite.

13. The ECS of claim 8, wherein the one or more processors are further configured to transmit, to the IMS, routing information for routing the emergency call through a next generation core service to a public safety answering point.

14. The ECS of claim 8, wherein the visited network is a 5G visited network.

15. The ECS of claim 8, wherein the IMS is configured to route the emergency call to a next generation core service (NGCS) as part of a protocol related to addressing calls with a hidden or spoofed identity to establish the emergency call with a public safety answering point (PSAP).

16. A device, comprising:
one or more processors configured to:
receive, from an internet protocol multimedia subsystem (IMS) of a home network associated with a user device and in connection with an emergency call initiated by the user device while the user device is roaming in a visited network, a device identity of the user device;
transmit the device identity to a gateway mobile location center (GMLC);
receive, from the GMLC and based on transmitting the device identity, a subscriber identity of the user device; and
transmit the subscriber identity to an IMS of the visited network to enable a response to the emergency call,
wherein the IMS is configured to sign and encrypt the subscriber identity, and
wherein the IMS is configured to route the emergency call when the emergency call includes the signed and encrypted subscriber identity as part of a protocol related to addressing calls with a hidden or spoofed identity.

17. The device of claim 16, wherein the device identity is an international mobile equipment identity (IMEI), and the subscriber identity is a mobile station international subscriber directory number (MSISDN).

18. The device of claim 16, wherein the one or more processors are configured to transmit the device identity to the GMLC based on a determination that the subscriber identity is not in a session initiation protocol invite.

19. The device of claim 16, wherein the one or more processors are further configured to transmit, to the IMS of the visited network in addition to the subscriber identity, routing information for routing the emergency call through a next generation core service to a public safety answering point.

20. The device of claim 16, wherein the IMS is configured to route the emergency call to a next generation core service (NGCS) as part of a protocol related to addressing calls with a hidden or spoofed identity to establish the emergency call with a public safety answering point (PSAP).

* * * * *